(12) United States Patent
Shinkai et al.

(10) Patent No.: US 10,976,436 B2
(45) Date of Patent: Apr. 13, 2021

(54) OBSTACLE DETECTION DEVICE

(71) Applicant: KUBOTA CORPORATION, Osaka (JP)

(72) Inventors: Atsushi Shinkai, Sakai (JP); Yushi Matsuzaki, Sakai (JP); Tomoya Omura, Sakai (JP); Tomofumi Fukunaga, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/810,977

(22) Filed: Mar. 6, 2020

(65) Prior Publication Data

US 2020/0225348 A1 Jul. 16, 2020

Related U.S. Application Data

(63) Continuation of application No. PCT/JP2018/033057, filed on Sep. 6, 2018.

(30) Foreign Application Priority Data

Sep. 13, 2017 (JP) .............................. JP2017-175932

(51) Int. Cl.
*G01S 15/931* (2020.01)
*G01S 3/808* (2006.01)
(Continued)

(52) U.S. Cl.
CPC .......... *G01S 15/931* (2013.01); *G01S 3/8083* (2013.01); *G01S 7/527* (2013.01); *G01S 15/101* (2013.01)

(58) Field of Classification Search
CPC ...... G01S 15/931; G01S 3/8083; G01S 7/527; G01S 15/101
(Continued)

(56) References Cited

U.S. PATENT DOCUMENTS 6,055,042 A * 4/2000 Sarangapani ......... G01S 13/931
356/4.01
8,498,958 B2 * 7/2013 Inoue .................... G01S 13/931
706/54
(Continued)

FOREIGN PATENT DOCUMENTS

JP 08-166451 A 6/1996
JP 11-258339 A 9/1999
(Continued)

OTHER PUBLICATIONS

Official Communication issued in International Patent Application No. PCT/JP2018/033057, dated Dec. 11, 2018.

*Primary Examiner* — Eric Blount
(74) *Attorney, Agent, or Firm* — Keating and Bennett, LLP (57) ABSTRACT

An obstacle detection device includes an ultrasonic sensor, an obstacle detector to determine presence of an obstacle of interest if an intensity of a received ultrasonic wave exceeds a threshold value, and a threshold value setter to set a short-distance detection threshold value as the threshold value for the obstacle detection in a short-distance detection area in a vicinity of the ultrasonic sensor and to set a long-distance threshold value as the threshold value for the obstacle detection in a long-distance detection area located farther from the ultrasonic sensor than the short-distance detection area, the long-distance threshold value being less than the short-distance detection threshold value. The short-distance detection area is an area where variation in sound pressure distribution of transmitted ultrasonic waves is equal to or greater than the threshold value, and the long-distance detection area includes an area where the variation of the sound pressure distribution of transmitted ultrasonic wave is smaller than the threshold value.

3 Claims, 4 Drawing Sheets

(51) Int. Cl.
*G01S 7/527* (2006.01)
*G01S 15/10* (2006.01)

(58) Field of Classification Search
USPC .......................................................... 340/435
See application file for complete search history.

(56) References Cited

U.S. PATENT DOCUMENTS

| | | | |
|---|---|---|---|
| 8,555,724 B2 * | 10/2013 | Terazawa | G01S 15/931 73/632 |
| 2001/0033246 A1 * | 10/2001 | Burchett | G01S 7/527 342/91 |
| 2010/0214872 A1 * | 8/2010 | Schmid | G01S 7/52004 367/98 |
| 2010/0242611 A1 * | 9/2010 | Terazawa | G01S 15/931 73/629 |
| 2014/0148992 A1 * | 5/2014 | Shaffer | F02D 29/00 701/33.7 |
| 2018/0095059 A1 * | 4/2018 | McQuillen | G01N 29/343 |
| 2018/0306889 A1 | 10/2018 | Koga | |

FOREIGN PATENT DOCUMENTS

| | | |
|---|---|---|
| JP | 2005-128008 A | 5/2005 |
| JP | 2005-343426 A | 12/2005 |
| JP | 2015-025712 A | 2/2015 |
| JP | 2016-191614 A | 11/2016 |
| JP | 2017-078912 A | 4/2017 |
| WO | 2019/054277 A1 | 3/2019 |

* cited by examiner

OBSTACLE DETECTION DEVICE

CROSS REFERENCE TO RELATED APPLICATIONS

This application claims the benefit of priority to Japanese Patent Application No. 2017-175932 filed on Sep. 13, 2017 and is a Continuation Application of PCT Application No. PCT/JP2018/033057 filed on Sep. 6, 2018. The entire contents of each application are hereby incorporated herein by reference.

BACKGROUND OF THE INVENTION

1. Field of the Invention

The present invention relates to an obstacle detection device for use in/with a work vehicle including an implement mounted on a vehicle body.

2. Description of the Related Art

Depending on environmental conditions, variations in ultrasonic waves occur in the propagation directions thereof and directions orthogonal to the propagation directions. Some measure to cope with such variations is needed for an obstacle detection device using an ultrasonic wave. For instance, in an attempt to resolve the problem of attenuation of ultrasonic waves differing according to an ambient temperature and ambient humidity, with an obstacle detection device mounted on a vehicle according to Japanese Unexamined Patent Application Publication No. 2016-191614, the device is configured to allow detection of an obstacle in a stable manner, free from a disturbing influence of temperature and/or humidity of ambient air, through adjustment of a threshold value used for obstacle detection according to ambient temperature and ambient humidity.

Further, in the case of a vehicle-mounted obstacle detection device according to Japanese Unexamined Patent Application Publication No. 2005-343426, the device is configured to detect an obstacle of interest if a signal level of a received reflection (echo) wave exceeds a predetermined threshold value. If traveling of the vehicle changes from reverse traveling to forward traveling, a threshold value of an obstacle detector provided at a rear corner portion of the vehicle is positively lowered relative to a threshold value for use at the time of reverse traveling of the vehicle. If the vehicle changes from forward traveling to reverse traveling, a threshold value of an obstacle detector provided at a front corner portion of the vehicle is positively lowered relative to a threshold value for use at the time of forward traveling of the vehicle. This arrangement is intended to achieve favorable detection of an obstacle which may present a possibility of the obstacle being entrapped by a front corner portion of the vehicle at the time of reverse traveling of the vehicle and also to achieve favorable detection of an obstacle which may present a possibility of the obstacle being entrapped by a rear corner portion of the vehicle at the time of forward traveling of the vehicle.

An ultrasonic sensor commonly employs an oscillator such as a piezoelectric device as its wave emission source. At a location far from the oscillator, sound pressure distribution will be substantially uniform in the propagation direction and the direction orthogonal thereto. Thus, through appropriate adjustment of amplification and/or threshold value of the reception signal, favorable obstacle detection is possible. On the other hand, in close proximity to the ultrasonic sensor, namely, in an area near the oscillator, there may occur irregular disturbances in the sound pressure distribution in the propagation direction as well as in the direction orthogonal thereto due to environmental conditions, etc. Further, in a case of an implement having a size exceeding the vehicle body width being mounted on a body of a work vehicle or the like, an ultrasonic wave transmitted from the ultrasonic sensor will be reflected in a complex manner by the implement and/or an accessory of the implement, so that in the close proximity to the ultrasonic sensor, there occurs an irregular disturbance of the sound field of the ultrasonic wave transmitted for the purpose of obstacle detection. And, such disturbance of the sound pressure distribution leads to erroneous detection of an obstacle. This problem cannot be solved by the threshold value adjustment technique disclosed in Japanese Unexamined Patent Application Publication No. 2016-191614 or Japanese Unexamined Patent Application Publication No. 2005-343426.

SUMMARY OF THE INVENTION

Preferred embodiments of the present invention provide obstacle detection devices capable of reducing or preventing erroneous detection of an obstacle in an obstacle detection target area including both a short-distance area that exhibits an irregular disturbance in the sound pressure distribution and a long-distance area that exhibits a uniform sound pressure distribution.

An obstacle detection device according to a preferred embodiment of the present invention for use in/with a work vehicle including an implement mounted on a vehicle body, includes an ultrasonic sensor to detect an obstacle through transmission/reception of an ultrasonic wave to/from the obstacle, an obstacle detector to determine a presence of the obstacle if an intensity of a received ultrasonic wave exceeds a threshold value, and a threshold value setter to set a short-distance detection threshold value as the threshold value for the obstacle detection in a short-distance detection area located in a vicinity of the ultrasonic sensor and to set a long-distance threshold value as the threshold value for the obstacle detection in a long-distance detection area located farther from the ultrasonic sensor than the short-distance detection area, the long-distance threshold value being less than the short-distance detection threshold value, wherein the short-distance detection area includes an area where a variation in a sound pressure distribution of a transmitted ultrasonic wave is equal to or greater than the threshold value, and the long-distance detection area includes an area where the variation of the sound pressure distribution of the transmitted ultrasonic wave is smaller than the threshold value.

With the above-described configuration, the detection target area for detection of an obstacle of interest by an ultrasonic sensor is divided into a short-distance detection area and a long-distance detection area. The short-distance detection area is an area where the variance in the sound pressure distribution of transmitted ultrasonic wave is equal to or greater than a predetermined value, based on a sound field disturbance factor inherent in the configuration of the ultrasonic sensor per se and a sound field disturbance factor due to diffused reflection of the ultrasonic wave by some object such as an implement present nearby the vehicle body with the ultrasonic sensor. The long-distance detection area is an area where the variance of the sound pressure distribution of the transmitted ultrasonic wave is smaller than the threshold value due to substantial absence of the above-described two sound field disturbance factors. Thus, in a time division showing a reflection wave from the long-distance detection area, a preset standard threshold value (preset based on an intensity of a reception ultrasonic wave received from a standard reflecting body detected under an appropriate environment) will be used as it is as a long-distance threshold value. In contrast, in the case of the short-distance detection area, a short-distance threshold value having a greater value than the long-distance threshold value is preferably used. With this arrangement, erroneous obstacle detection in the short-distance detection area is decreased or prevented.

A borderline between the short-distance detection area and the long-distance detection area is not necessarily distinct, but there exists a certain breadth therebetween. For this reason, according to a preferred embodiment of the present invention, there is provided an intermediate-distance detection area between the short-distance detection area and the long-distance detection area, and for the intermediate-distance detection area, as the threshold value, there is set an intermediate-distance threshold value having a value between the short-distance threshold value and the long-distance threshold value. With this arrangement, even when the border between the short-distance detection area and the long-distance detection area is not distinct, with setting of an intermediate-distance detection area as a transitional area therebetween and setting of an intermediate threshold value therefor, there is realized smooth transition of obstacle detection between the short-distance detection area and the long-distance detection area.

Sound pressure distribution of an ultrasonic wave in the direction of its propagation depends largely on attenuation by distance which can be represented by a relatively smooth curve, so that it can be readily coped with by amplification along the time axis of the reception signal. On the other hand, sound pressure distribution of an ultrasonic wave in the direction orthogonal to the direction of propagation is readily affected by influences of noise (diffused reflection, etc.) from the surrounding area, so that significant variation can sometimes occur even within a minute (unit) propagation period. In such a case, it is not possible to cope with the issue by the amplification along the time axis of the reception signal based on distance-related attenuation. For this reason, according to a preferred embodiment of the present invention, the short-distance detection area is determined based on variance (irregularities) of sound pressure in an orthogonal plane within the minute (unit) propagation period.

In the short-distance detection area, there occurs significant disturbance in the sound field. Thus, in order to avoid the erroneous detection of an obstacle, it will be advantageous to associate only reception signals having sufficiently large intensities with the presence of an obstacle. For this reason, according to a preferred embodiment of the present invention, the short-distance threshold value is set to be equal to or greater than three-fold of the long-distance threshold value and to be equal to or smaller than four-fold of the long-distance threshold value.

If an implement has a greater width than the width of the vehicle body, thus a portion of the implement protrudes laterally from the vehicle body, even if the vehicle body can circumvent an obstacle successfully, the implement may hit this obstacle. Therefore, the length from the lateral end of the vehicle body to the corresponding lateral end of the implement will be the width of the traveling path of the work vehicle created by traveling of its vehicle body. Being an area of the obstacle where this obstacle can be circumvented by the vehicle body, but not by the implement, the area created by this path width is a significant detection target area for obstacle detection when the work vehicle is traveling. Moreover, this detection target area is an area abundant in diffused reflection, where erroneous detection tends to occur if the standard threshold value of the ultrasonic sensor is used. For this reason, for obstacle detection in the detection target area, an obstacle detection device according to a preferred embodiment of the present invention can be used advantageously. For this reason, according to a preferred embodiment of the present invention, the width of the implement is greater than the width of the vehicle body, the ultrasonic sensor is attached to the vehicle body, and the detection area of the ultrasonic sensor is set as an area defined by eliminating a traveling path of the vehicle body from a traveling (movement) path of the implement.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Next, with reference to the accompanying drawings, self-propelled work vehicles according to preferred embodiments of the present invention will be explained. In the following detailed description, unless explicitly indicated otherwise, a word "front" means the forward or front side with respect to the vehicle body front/rear direction (traveling direction), and a word "rear" means the rear side with respect to the vehicle body front/rear direction (traveling direction). Further, the left/right direction or lateral or transverse direction means the direction traversing the vehicle body (vehicle body width direction) orthogonal to the vehicle body front/rear direction. Also, a word "upper" and a word "lower" relate to the positional relationship in the orthogonal (vertical) direction of the vehicle body, representing such relationship with respect to the ground-clearance.

Figure 1:
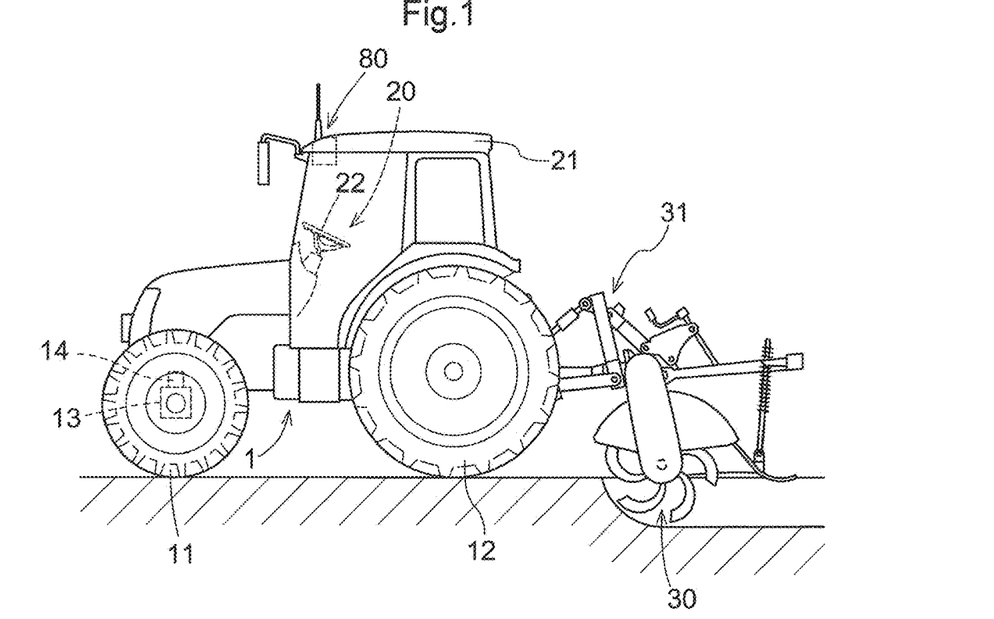
FIG. 1 is a side view showing a tractor as an example of a work vehicle mounting an obstacle detection device according to a preferred embodiment of the present invention.

As shown in FIG. 1, in a tractor, a maneuvering system 20 is provided at the center or approximate center of a vehicle body 1 that is supported via front wheels 11 and rear wheels 12. At a rear portion of the vehicle body 1, there is mounted, via a hydraulic lift mechanism 31, an (utility) implement 30 which is, for example, a rotary cultivator. The front wheels 11 function as steering wheels, so that with a change of their steering angle, the traveling direction of the tractor is changed accordingly. The steering angle of the front wheels 11 is changed by an operation of a steering mechanism 13. The steering mechanism 13 includes a steering motor 14 to perform automatic steering. At time of manual traveling, steering of the front wheels 11 is possible by an operation of a steering wheel 22 included in the maneuvering system 20. In a cabin 21 of the tractor, there is provided a satellite positioning module 80 which preferably includes a GNSS (global navigation satellite system). Included in the satellite positioning module 80, a satellite antenna for reception of GNSS signals (including GPS signals) is attached to a ceiling area of the cabin 21. Incidentally, to compliment the satellite navigation technique, there may be used an inertial navigation module incorporating a gyro acceleration sensor or a magnetic direction sensor within the satellite positioning module 80. Such an inertial navigation module can be provided at a site separate from the satellite positioning module 80.

Figure 2:
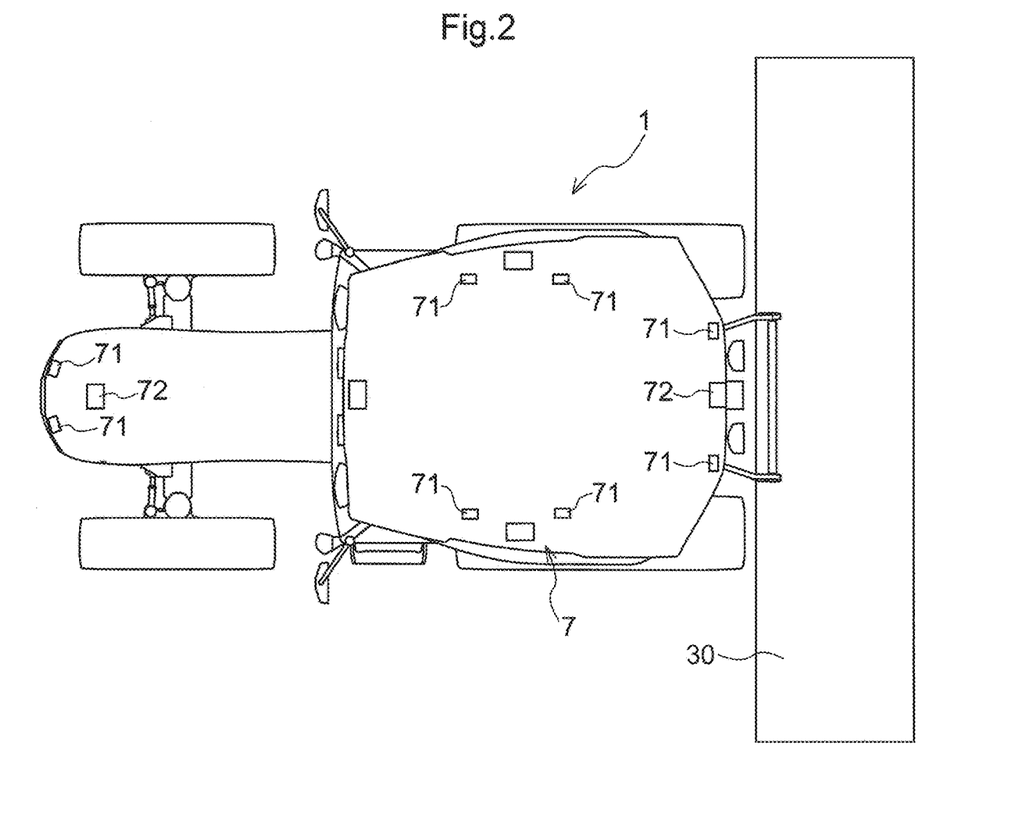
FIG. 2 is a schematic plan view of the tractor showing a group of obstacle detection sensors mounted on the tractor.

As shown schematically in FIG. 2, the vehicle body 1 of the tractor mounts a group of obstacle sensors 7 to detect an obstacle of interest, which may present an obstacle in traveling. The obstacle sensor group 7 includes, as obstacle sensors, ultrasonic sensors 71 called also as "sonars" and laser scanners 72 called also as "lidars". Two of the ultrasonic sensors 71 are provided each at front, rear, left and right portions of the vehicle body, so as to total eight, so that these sensors may effect detections of any obstacle(s) present in the vicinity of the vehicle body 1 substantially omnidirectionally relative thereto. One of the laser scanners 72 is provided each at front and rear portions of the vehicle body 1 to detect obstacles present at positions far from the vehicle body 1 in the forward traveling direction and the reverse traveling direction.

Figure 3:
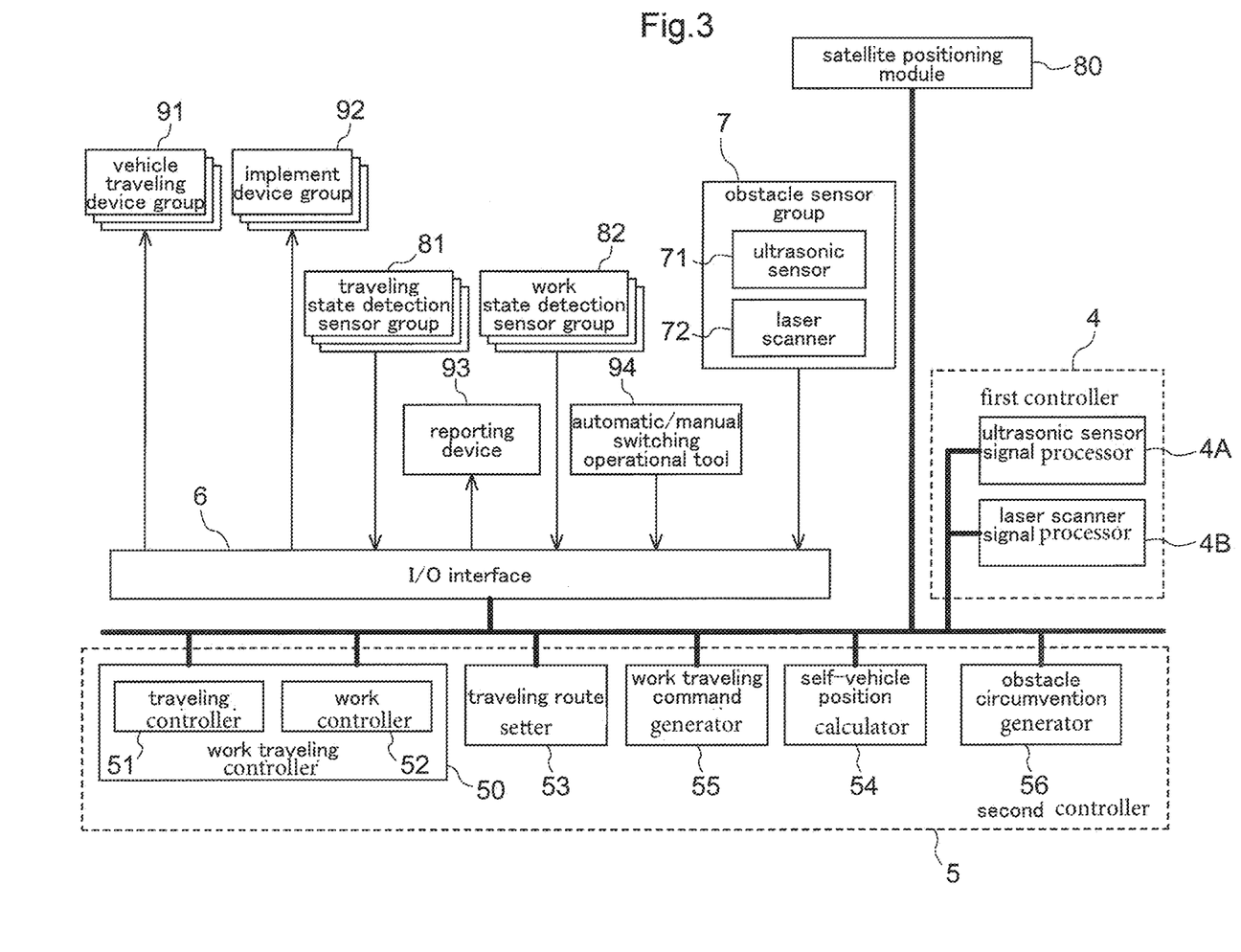
FIG. 3 is a functional block diagram showing a control system of the tractor.

FIG. 3 shows a control system included in this tractor. In this control system, there are provided a first controller 4 and a second controller 5 which are connected to each other via a vehicle-mounted LAN. Detection signals from the obstacle sensor group 7 will be transmitted to the first controller 4 via an I/O (input/output) interface 6. The first controller 4 that defines and functions as an "obstacle detector" includes an ultrasonic sensor signal processor 4A and a laser scanner signal processor 4B. The ultrasonic sensor signal processor 4A is configured or programmed to perform obstacle detection based on detection signals from the ultrasonic sensors 71 and to transmit obstacle information relating to an obstacle of interest to the second controller 5. Similarly, the laser scanner signal processor 4B is configured or programmed to perform obstacle detection based on detection signals from the laser scanners 72 and to transmit obstacle information relating to an obstacle to the second controller 5 via the I/O interface 6. The satellite positioning module 80 also is connected to the second controller 5 via the vehicle-mounted LAN.

Also connected to the second controller 5, via the I/O interface 6, are a vehicle traveling device group 91, an implement device group 92, a reporting device 93, an automatic/manual switching operational tool 94, a traveling state detection sensor group 81, and a work state detection sensor group 82. The vehicle traveling device group 91 includes controllers accompanying a speed change mechanism and an engine, the speed change mechanism is controlled for vehicle traveling. The implement device group 92 includes controllers to drive the implement 30 (see FIG. 1) and the lift mechanism 31 (also see FIG. 1). The reporting device 93 includes a display, a lamp, a speaker, etc. to issue a report (i.e., provide an alarm) related to a work traveling (i.e., traveling accompanied by a utility work) to the driver or a monitoring/managing person.

The automatic/manual switching operational tool 94 is a switch to select either an automatic traveling mode to travel by automatic steering and a manual steering mode to travel by manual steering operations. If this automatic/manual switching operational tool 94 is operated during traveling in the automatic steering mode, the traveling is switched to the manual steering mode. Conversely, if this automatic/manual switching operational tool 94 is operated during traveling in the manual steering mode, the traveling is switched to the automatic steering mode. The traveling state detection sensor group 81 includes sensors to detect traveling states such as a steering angle, an engine rotational speed, a speed change state, etc. The work state detection sensor group 82 includes use mode detection sensors to detect various use states of the implement 30 (see FIG. 1), such as a posture, a ground clearance, a used width, etc. thereof.

The second controller 5 is configured or programmed to include a work traveling controller 50, a traveling route setter 53, a self-vehicle position calculator 54, a work traveling command generator 55 and an obstacle circumvention generator 56. The traveling route setter 53 stores a traveling route as a traveling target route for automatic traveling in a readable memory. Such a traveling route may be generated on the side of the tractor or generated firstly in a computer installed remotely of the tractor and then downloaded to the second controller 5. The self-vehicle position calculator 54 calculates a coordinate position (i.e., position coordinates) of the vehicle body 1 (see FIG. 1) on a map as a "self-vehicle position", based on positioning data from the satellite positioning module 80 adopting GPS, etc. The work traveling command generator 55 obtains, at time of the automatic traveling, a difference amount between the self-vehicle position calculated by the self-vehicle position calculator 54 and a traveling route set by the traveling route setter 53 and then generates a traveling command (including a steering command and a speed command) to reduce or minimize this difference amount.

The work traveling controller 50 is configured or programmed to include a traveling controller 51 and a work controller 52. The traveling controller 51 includes an automatic traveling control function (automatic traveling mode) and a manual traveling control function (manual traveling mode). When the automatic traveling mode is selected, the traveling controller 51 provides control signals to the vehicle traveling device group 91, based on a traveling command from the work traveling command generator 55. The work controller 52 provides control signals to the implement device group 92, based on a work command from the work traveling command generator 55. When the manual traveling mode is selected, manual traveling based on a driver's operation of the steering wheel 22 (FIG. 1) is effected. Similarly, the work controller 52 also includes an automatic work control function to cause the implement device group 92 to be activated automatically and a manual work control function to allow manual control of the implement device group 92 using various operational tools.

The obstacle circumvention generator 56 generates a circumvention command to avoid contact between an obstacle and the vehicle body 1 (see FIG. 1) and the implement 30 (see FIG. 1), based on the obstacle information transmitted by the first controller 4, and then provides this circumvention command to the work traveling command generator 55 or the traveling controller 51. Such circumvention command may include an emergency brake, an engine stop, an implement stop, a traveling stop, an automatic traveling stop, a traveling route change, etc. Further, the obstacle circumvention generator 56 reports detection of an obstacle of interest by the first controller 4 through the reporting device 93.

Figure 4:
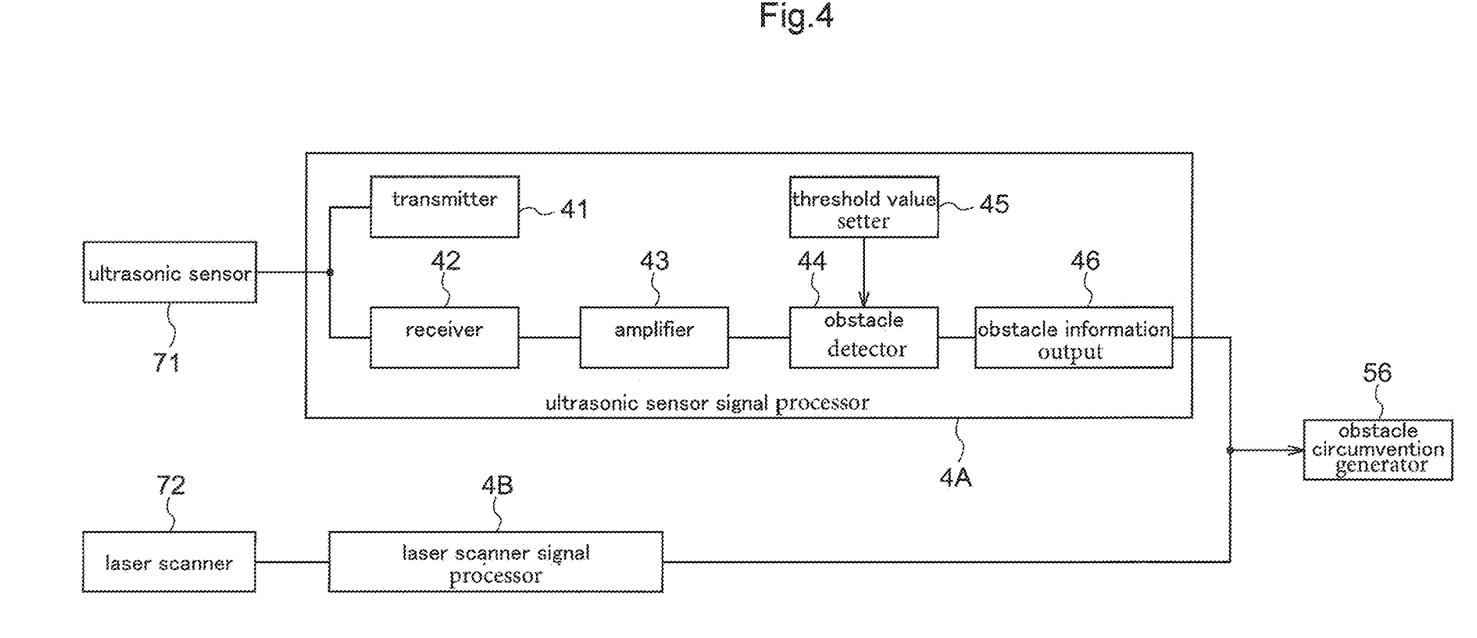
FIG. 4 is a functional block diagram of an obstacle detection processing system.

The configuration of the ultrasonic sensor signal processor 4A of the obstacle detection device in combination with the ultrasonic sensors 71 is shown in FIG. 4. This ultrasonic sensor signal processor 4A is configured or programmed to include a transmitter 41, a receiver 42, an amplifier 43, an obstacle detector 44, a threshold value setter 45 and an obstacle information output 46.

Each ultrasonic sensor 71 incorporates therein a piezoelectric device. The transmitter 41 sends a pulse voltage to the piezoelectric device incorporated in the ultrasonic sensor 71. Then, an ultrasonic wave will be transmitted from the piezoelectric device energized by the pulse voltage. This transmitted ultrasonic wave will be reflected by an object, such as an obstacle of interest, present, if any, in the surrounding of the vehicle and will be received as a "reflection (echo) wave" by the piezoelectric device of the ultrasonic sensor 71. The receiver 42 effects preprocessing on the signals of the received ultrasonic wave. And, the amplifier 43 amplifies the intensity (amplitude) of the preprocessed ultrasonic wave signal along the time axis. This amplification is effected based on an amplification curve designed to compensate for the intensity which is attenuated with a lapse of the propagation period (propagation distance) of the ultrasonic wave. This arrangement is provided such that the intensity (amplitude) of the ultrasonic signal may remain the same or substantially same as long as its reflection characteristics are the same or substantially the same even if distances from the ultrasonic sensor 71 differ.

Figure 5:
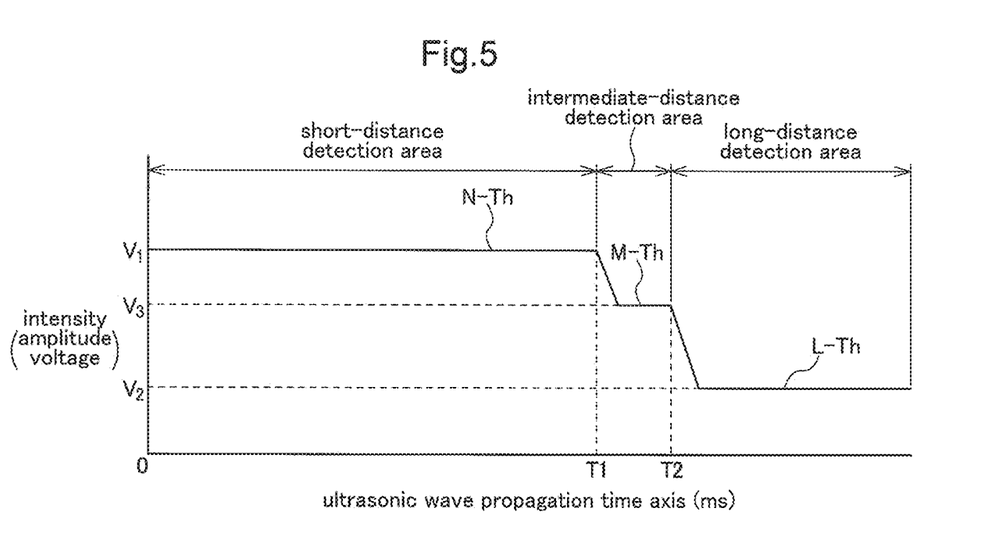
FIG. 5 is an explanatory view for explaining a short-distance detection area and a long-distance detection area in an ultrasonic wave propagation direction.

The obstacle detector 44 effects obstacle detection in which an obstacle is determined to be present if the intensity of the received ultrasonic wave amplified by the amplifier 43 exceeds a threshold value. As such threshold value defining the determination condition in the obstacle detection, the threshold value setter 45 sets a short-distance threshold value as well as a long-distance threshold value which is smaller than the short-distance threshold value. The short-distance threshold value is for use in obstacle detection in a short-distance area located in the vicinity of the ultrasonic sensor 71. Whereas, the long-distance threshold value is for use in obstacle detection in a long-distance area located far from the ultrasonic sensor 71. Incidentally, in the instant preferred embodiment, as shown in FIG. 5, between the short-distance detection area and the long-distance detection area, there is provided also an intermediate-distance detection area. And, for this intermediate-distance detection area, there is set, as the threshold value, an intermediate-distance threshold value having a value between the short-distance threshold value and the long-distance threshold value. In the example shown in FIG. 5, the short-distance detection area is a division up to an ultrasonic wave propagation period (distance): T1 (ms: microseconds) from the ultrasonic sensor 71. The intermediate-distance detection area is a division from the ultrasonic wave propagation period from (distance): T1 (ms: microseconds) to an ultrasonic wave propagation period (distance): T2 (ms). And, the long-distance detection area is a division after the ultrasonic wave propagation period (distance): T2 (ms). The short-distance threshold value for use in the short-distance detection area is expressed by: N–Th. The intermediate-distance threshold value for use in the intermediate-distance detection area is expressed by: M–Th. The long-distance threshold value for use in the long-distance detection area is expressed by: L–Th. Each threshold value is represented in terms of an amplitude voltage. In the instant preferred embodiment, N–Th (short-distance threshold value) is set to be equal to or greater than three-fold and also equal to or smaller than four-fold of L–Th (long-distance threshold value), and M–Th (intermediate-distance threshold value) is set to be equal to or greater than two-fold and also equal to or smaller than three-fold of L–Th (long-distance threshold value). Further, the length of the short-distance detection area (corresponding to T1) is preferably set to about 0.7 m, for example. The length of the intermediate-distance detection area (corresponding to T1–T2) is preferably set to about 0.3 m, for example. Incidentally, it is noted that the intermediate-distance detection area is not an essential requirement, and the long-distance detection area may be set immediately after the short-distance detection area.

Figure 6:
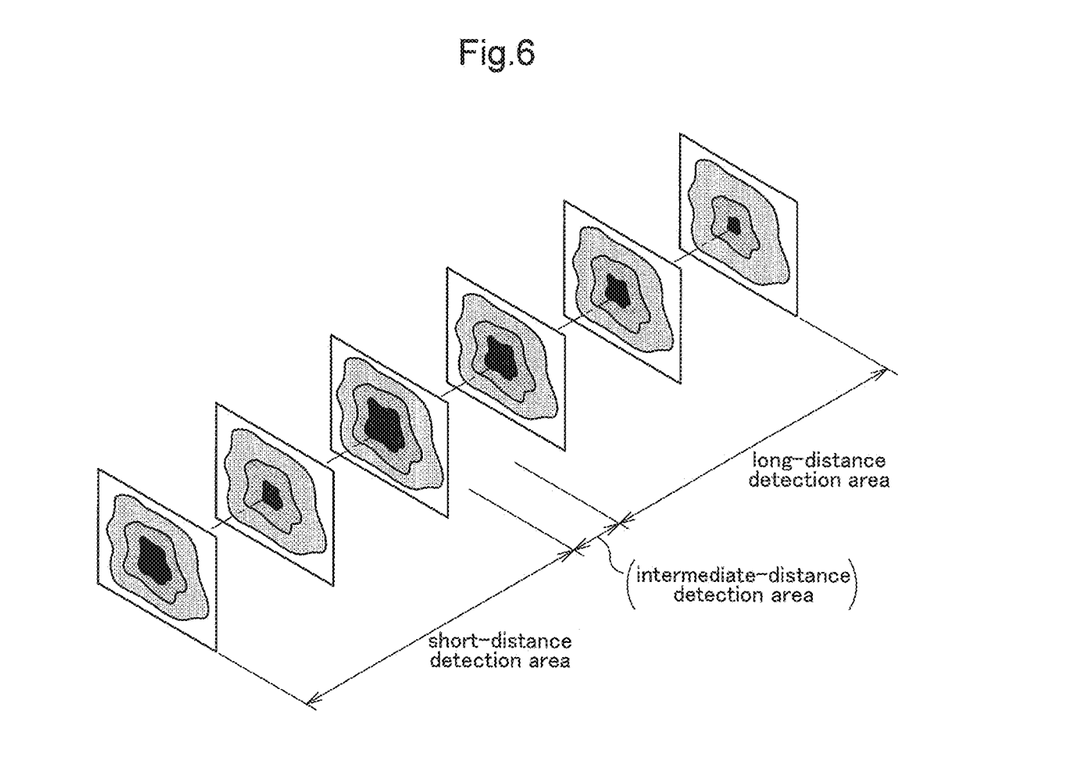
FIG. 6 is a schematic view illustrating relationship among a short-distance threshold value, an intermediate-distance threshold value and a long-distance threshold value.

The short-distance detection area and the long-distance detection area will be determined based on irregularities (variances) of sound pressures in the sound field created by an ultrasonic sensor 71. More particularly, an area where the variance in the sound pressure distribution of the transmitted ultrasonic wave is equal to or greater than a predetermined value will be set as the short-distance detection area. An area where the variance in the sound pressure distribution of the transmitted ultrasonic wave is less than the predetermined value will be set as the long-distance detection area. The intermediate-distance detection area may be set appropriately as a transitional area from the short-distance detection area to the long-distance detection area. This is schematically illustrated in FIG. 6. As shown, sound pressure distributions (the center point corresponds to the center of the ultrasonic wave propagation) are determined (or sampled) in planes perpendicular or substantially perpendicular to the ultrasonic wave propagation direction at each determination (sampling) time point on the propagation time axis which corresponds to the ultrasonic wave propagation direction. Then, based on the results of such determinations, the short-distance detection area, the intermediate-distance detection area, the long-distance detection area as well as the short-distance threshold value, the intermediate-distance threshold value and the long-distance threshold value therefor will be set.

According to one specific non-limiting example of a method of obtaining the short-distance detection area, from many sound pressure distributions obtained via determinations implemented at the actual attached position of the ultrasonic sensor 71, a degree of similarity between two adjacently measured distributions spaced apart via a minute propagation period (unit time interval) therebetween is calculated. And, a timing at which the variation in the sound pressure distribution becomes "smooth" as indicated by a diminishing similarity degree is set as the end point of the short-distance detection area. In fact, as various kinds of similarity degree calculation algorithms are known in the art, some appropriate calculation algorithm will be selected for use. Further, in determination of an appropriate determination similarity degree (a predetermined value) for the short-distance detection area, an effort will be made to find such degree of similarity of an area where erroneous detection of an obstacle occurs frequently as compared with the degree of similarity in the area having a sufficiently long propagation distance and then based on such similarity degree, the determination similarity degree may be decided.

The configuration of the laser scanner signal processor 4B of the obstacle detection device in combination with the laser scanners 72 is a conventionally known configuration, thus explanation thereof will be omitted herein.

The obstacle detection device including the ultrasonic sensors 71 described above will be installed at a location to detect both the short-distance detection area characterized by irregular sound pressure distribution and the long-distance detection area characterized by uniform sound pressure distribution. In particular, in the case of the tractor shown in FIG. 1 mounting the implement 30 having a greater width than the vehicle body, the inventive obstacle detection device is useful for an ultrasonic sensor having, as its detection target areas, an inside area defined by elimination of the traveling path of the vehicle body 1 from the traveling (movement) path of the implement 30 and the area outside it. In such a case, such an inside area will be set as the short-distance detection area and the outside area will be set as the long-distance detection area, respectively.

Other Preferred Embodiments (1) The short-distance threshold value, the intermediate-distance threshold value and the long-distance threshold value may be parallel straight lines (constant values) or may be oblique lines (linear) or curved lines (non-linear), or may be any appropriate combination of the above.

(2) In the foregoing preferred embodiments of the present invention, as a work vehicle mounting the inventive obstacle detection device, a tractor mounting a cultivator implement was cited as an example thereof. However, preferred embodiments of the present invention are applicable also to a tractor mounting any utility implement other than a cultivator or are applicable even to a farming machine or vehicle such as a combine, a rice planter or a civil engineering machine.

(3) In the foregoing preferred embodiments of the present invention, the first controller 4 and the second controller 5 are connected to each other via a vehicle-mounted LAN and mounted as such on the tractor. Alternatively, the first controller 4 may be incorporated within such a device as a tablet computer, a notebook computer which is to be carried by a managing person and which exchanges data wirelessly with the control system of the tractor. Further alternatively, the first controller 4 may be incorporated within the second controller 5.

(4) The specific division of the respective functional sections or elements of the ultrasonic sensor signal processor 4A shown in FIG. 4 is only exemplary intended for facilitating understanding of this disclosure. In fact, various integrations or unifications of the respective functional sections or elements, or further divisions of any single functional section or element can be made freely.

Preferred embodiments of the present invention can be mounted on various types of work vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An obstacle detection device for use in/with a work vehicle including an implement mounted on a vehicle body, the obstacle detection device comprising:
   an ultrasonic sensor to detect an obstacle through transmission/reception of an ultrasonic wave to/from the obstacle;
   an obstacle detector to determine a presence of the obstacle if an intensity of a received ultrasonic wave exceeds a threshold value; and
   a threshold value setter to set a short-distance detection threshold value as the threshold value for the obstacle detection in a short-distance detection area located in a vicinity of the ultrasonic sensor and to set a long-distance threshold value as the threshold value for the obstacle detection in a long-distance detection area located farther from the ultrasonic sensor than the short-distance detection area, the long-distance threshold value being less than the short-distance detection threshold value; wherein
   the short-distance detection area is divided from the long-distance detection area in advance of obstacle detection based on the short-distance detection area being an area where a variation in a sound pressure distribution of a transmitted ultrasonic wave caused by a configuration of the ultrasonic sensor or a configuration of the implement is equal to or greater than the threshold value;
   the long-distance detection area is divided from the short-distance detection area in advance of the obstacle detection based on the long-distance detection area being an area where the variation of the sound pressure distribution of the transmitted ultrasonic wave caused by the configuration of the ultrasonic sensor or the configuration of the implement is smaller than the threshold value; and
   the variation of the sound pressure distribution includes a variation of sound pressure distribution in a plane perpendicular or substantially perpendicular to a direction of propagation of the transmitted ultrasonic wave within a propagation period.

2. The obstacle detection device of claim 1, wherein
   an intermediate-distance detection area is provided between the short-distance detection area and the long-distance detection area; and
   the threshold value of the intermediate-distance detection area is between the short-distance threshold value and the long-distance threshold value.

3. The obstacle detection device of claim 1, wherein the short-distance threshold value is equal to or greater than three-fold of the long-distance threshold value and equal to or smaller than four-fold of the long-distance threshold value.

* * * * *